2,699,456

FLUID CLASSIFICATION OF BENZENE HEXACHLORIDE ISOMERS

Richard H. Kimball, Lewiston, and Keith J. Smith, Niagara Falls, N. Y., assignors to Hooker Electrochemical Company, Niagara Falls, N. Y., a corporation of New York No Drawing. Application October 19, 1949, Serial No. 122,356

6 Claims. (Cl. 260—648)

This invention relates to the fluid classification of a mixture of stereoisomers whereby the percentage of at least one such isomer may be increased with respect to other isomers in the mixture. It is particularly concerned with methods for providing a mixture of benzene hexachloride isomers relatively enhanced in gamma content; and still more particularly, it is concerned with methods for producing substantially pure gamma benzene hexachloride, i. e., benzene hexachloride having a gamma content of at least ninety-eight percent.

The separation of mixtures of isomeric organic compounds constitutes a frequently encountered problem. Various methods of solving this problem have been proposed, involving simple selective solvent extraction, fractional crystallization with and without prior ester or other compound formation, chromatographic adsorption procedures, et cetera. However, when these procedures are applied to mixtures of the isomers of benzene hexachloride on a commercial scale, indifferent results have been obtained and the application of published procedures has not enabled the supply of a substantially pure gamma benzene hexachloride to the insecticidal trade.

Mixtures of isomers of benzene hexachloride containing varying amounts of the gamma isomer have been extensively used in insecticidal compositions. However, of the various isomers of benzene hexachloride, only the gamma isomer possesses insecticidal activity to a useable degree. The other isomers and impurities present in the crude technical benzene hexachloride do not contribute to the insecticidal activity, and are even responsible for many undesirable properties of crude technical benzene hexachloride. These include an offensive odor and marked irritation of animal mucous membranes, severe plant injury when used on certain crops, the imparting of undesirable flavors and odors to the edible portion of plants treated therewith, and certain pronounced toxic effects when used on animals or their forage crops. On the other hand the substantially pure gamma isomer of benzene hexachloride is largely free from these undesirable effects, which are still further reduced by the much smaller quantities needed for a given insecticidal effect, in comparison with crude benzene hexachloride.

It is therefore a principal object of the present invention to provide a method of separating the gamma isomer of benzene hexachloride from a mixture of isomers of benzene hexachloride, whereby a substantially pure gamma isomer can be obtained. A further object of the invention is to provide a process for the separation of isomers of benzene hexachloride whereby a fraction having an enhanced proportion of gamma isomer may be obtained. An additional object of the invention is to provide a process for the separation of isomers of benzene hexachloride whereby a fraction containing an enhanced ratio of the gamma isomer to the alpha isomer can be obtained. Other objects will become apparent hereinafter.

We have now found that granular crystals of the gamma isomer of benzene hexachloride can be produced from solutions of benzene hexachloride compositions in which the ratio of dissolved gamma isomer to dissolved alpha isomer is at least 1.4 to 1.0 and that the crystals of the beta and alpha isomers produced are smaller, with the latter tending to form loose aggregates. Based on this discovery, we have found that the relative gamma content of benzene hexachloride compositions can be enhanced by effecting a separation of such gamma isomer crystals from crystals of the alpha and beta isomers in a fluid medium. Bulletin 1471–49 of the U. S. Department of Agriculture dated July 12, 1949, entitled "An Additional Residual Insecticide for Fly Control in Dairy Barns" assigns the common name "lindane" to the essentially pure gamma isomer of benzene hexachloride, containing not less than 99 percent of the gamma isomer. By the above separation of gamma isomer crystals from crystals of the alpha and beta isomers in a fluid medium, lindane may be recovered directly, or, by repetition of this process, the concentration of gamma isomer may be raised to the point where even conventional methods of purification will produce lindane. These findings were surprising and unexpected, in view of the fact that the true densities of each of the solid benzene hexachloride isomers are substantially the same.

Therefore, this invention includes crystallizing benzene hexachloride compositions from solutions in which the ratio of dissolved gamma to alpha isomers is at least 1.4 to 1.0 and separating in a fluid medium the crystals so produced, whereby compositions containing enhanced proportions of the gamma isomer, or lindane itself, are produced.

Benzene hexachloride compositions containing at least 1.4 parts of the gamma isomer per part of the alpha isomer are easily prepared by processes well known in the prior art, such as, for example, chlorinating benzene in the presence of actinic light until it is partially converted to benzene hexachloride, evaporating off part of the unchanged benzene, filtering off the crystals consisting largely of alpha and beta isomers, and concentrating the filtrate.

Solutions containing at least the 1.4 to 1.0 ratio of dissolved gamma to alpha isomers, which we have found necessary in order to produce a mixture of crystals separable in accordance with this invention, can be prepared by dissolving compositions of the prior art supra, which contain the proper gamma-alpha ratio, in a suitable solvent. Such solutions can also be prepared by adding the benzene hexachloride composition to be treated to a solvent previously saturated with respect to at least the gamma and alpha isomers at the predetermined temperature at which crystallization is to be effected and heating to effect solution. Still another method of preparing such solutions, when the crude benzene hexachloride composition to be treated does not contain the desired gamma to alpha ratio, is to use a solvent having a gamma-alpha solubility ratio of at least 1.4 to 1.0 in such amounts as are necessary to dissolve most or all of the gamma isomer, and separating the solution from the undissolved solids. Still various other methods of preparing the solution may be used and it is only necessary that such solutions contain the aforesaid gamma-alpha ratio for the purposes of this invention. The solvents which may be used for making such solutions include alcohols, such as methanol, ethanol, n-propanol or iso-propanol; ketones, such as acetone or methyl ethyl ketone; aromatic solvents, such as benzene or toluene; et cetera.

Crystallization of the benzene hexachloride isomers from the solutions so produced is then effected to the desired extent and the mixture of crystals obtained is separated in accordance with this invention. We prefer to conduct the fluid separation in an inert medium comprising the same type of fluid as that used in the crystallization step, or, at least a fluid miscible with the solvent utilized in the crystallizing step. By "inert" as used in the foregoing sentence, we mean that the medium has substantially no dissolving power for at least the gamma isomer of benzene hexachloride.

The crystallization step of our process may be carried out in various manners, such as by concentration or cooling or a combination of both. During the crystallization, we have found it advantageous to use agitation. Any convenient manner of agitation may be used, such as aeration, propeller-type stirrers, et cetera. In some instances, it may be desirable to start the crystallization by seeding; however, this has not been found to be essential.

In conducting the separation in a fluid medium of a mixture of crystalline isomers of benzene hexachloride produced in accordance with this invention, various techniques may be employed. Thus, a column provided with a moving fluid is satisfactory. Representative fluids are, for example, organic compounds, such as alcohols like methanol, ethanol, et cetera; ketones, such as acetone, cyclohexanone, et cetera; aromatic hydrocarbons like benzene and toluene; halogenated organic compounds; or mixtures thereof; air; and water. If a fluid in which the gamma isomer is soluble is used, it is desirable to have the fluid saturated at least with gamma isomer in order to prevent undue loss of the isomer. Various commercial devices such as hydraulic classifiers, jigs, thickeners, tables, et cetera, may be used in the fluid separation of our invention.

In the following examples, which are given to illustrate this invention further, but which are not to be construed as limiting, the procedures and techniques used were standardized as nearly as practical so that comparisons may be made, as well as to demonstrate this invention so that it may be readily understood.

The solutions to be crystallized were prepared by adding the given quantity of the mixture of solid isomers to be separated to methanol which had been previously saturated with respect to the gamma and alpha isomers at the temperature chosen to effect crystallization, which was 10 degrees centigrade, except in one instance. Solution of the solids was then effected by heating to nearly reflux temperature (about 60 degrees centigrade) with stirring.

The crystallization was effected by cooling the solution from the higher temperature to 10 degrees centigrade with moderate agitation and maintaining said temperature and agitation for an additional one hour period. Since the solvent was previously saturated at 10 degrees centigrade with respect to the gamma and alpha isomers, substantially all of the gamma and alpha isomers in the solid mixture of isomers added crystallizes out again at 10 degrees centigrade, thus establishing that separation of these isomers does not result in this step of the process. In the following table, there is shown the results of fluid classifying the wet solids recovered from the crystallization step of each run.

The separation in a fluid medium, herein referred to as "fluid classification," was effected by introducing into a vertical elongated column at a substantially uniform rate over the course of one-half hour the slurry of crystals recovered from the crystallization step. The column was 32 millimeters in diameter and 120 centimeters in length, provided with a feed line entering the column about 40 centimeters from the top, an overflow exit and reservoir at the top, and a discharge exit and reservoir at the bottom. An inert fluid was introduced at the bottom of the tower at a rate such that it rose in the column about 50 centimeters per minute. The inert fluid used was a solution of methanol saturated with respect to the isomers being treated at the temperature of classification, which was conveniently chosen as room temperature. During operation, the relatively coarse, granular crystalline material sank to the bottom and was collected in the lower reservoir, while the relatively fine crystalline materials rose and overflowed and were collected at the top. After all the crystalline mixture was introduced, the column was operated for an additional fifteen minutes, thus providing time for a complete separation of the solids into either the coarse or fine fractions. The crystalline solids recovered at the top and bottom reservoirs were washed with small quantities of fresh methanol, dried and analyzed. All analyses of the isomers were conducted by the method of infrared spectroscopy.

The data presented in the tabulation of runs which follow were accumulated in the manner just described, except as discussed hereinafter.

*Table*

| Run Number | I | II | III | IV | V | VI | VII | VIII | IX | X |
|---|---|---|---|---|---|---|---|---|---|---|
| Composition of Solvent: | | | | | | | | | | |
| Alpha, Grams | 76 | 76 | 76 | 76 | 76 | 76 | 76 | 76 | 76 | 64 |
| Beta, Grams | 27 | 34 | 21 | 14 | 34 | 27 | 27 | 27 | 27 | 21 |
| Gamma, Grams | 143 | 143 | 143 | 143 | 143 | 143 | 143 | 143 | 143 | 204 |
| Delta, Grams | 41 | 41 | 41 | 41 | 41 | 41 | 41 | 41 | 41 | 36 |
| Epsilon, Grams | 8 | 8 | 8 | 8 | 8 | 8 | 8 | 8 | 8 | 9 |
| Methanol, Grams | 2,265 | 2,265 | 2,265 | 2,265 | 2,265 | 2,265 | 2,265 | 2,265 | 2,265 | 2,220 |
| Composition of Solid BHC To Be Dissolved in Solvent: | | | | | | | | | | |
| Alpha, Grams | 39 | 30 | 39 | 39 | 39 | 62 | 93 | 114 | 140 | 39 |
| Beta, Grams | 7 | 10 | 6 | 7 | | | | | | |
| Gamma, Grams | 350 | 160 | 156 | 156 | 93 | 93 | 93 | 93 | 93 | 156 |
| Total Grams | 396 | 200 | 201 | 202 | 132 | 155 | 186 | 207 | 233 | 195 |
| Ratio of Gamma to Alpha as 1.0 | 9.0 | 5.3 | 4.0 | 4.0 | 2.4 | 1.5 | 1.0 | 0.82 | 0.66 | 4.0 |
| Composition of Dissolved Solids: | | | | | | | | | | |
| Alpha, Grams | 115 | 106 | 115 | 115 | 115 | 138 | 169 | 190 | 216 | 103 |
| Beta, Grams | 34 | 44 | 27 | 21 | 34 | 27 | 27 | 27 | 27 | 21 |
| Gamma, Grams | 493 | 303 | 299 | 299 | 236 | 236 | 236 | 236 | 236 | 360 |
| Delta, Grams | 41 | 41 | 41 | 41 | 41 | 41 | 41 | 41 | 41 | 36 |
| Epsilon, Grams | 8 | 8 | 8 | 8 | 8 | 8 | 8 | 8 | 8 | 9 |
| Ratio of Gamma to Alpha as 1.0 | 4.29 | 2.86 | 2.6 | 2.6 | 2.05 | 1.71 | 1.40 | 1.24 | 1.09 | 3.5 |
| Percent, Gamma | 71.4 | 60.4 | 61.0 | 61.8 | 54.4 | 52.4 | 49.1 | 47.0 | 44.7 | 68 |
| Crystallization Temperature, °C | 10 | 10 | 10 | 10 | 10 | 10 | 10 | 10 | 10 | 30 |
| Fine Fraction Recovered: | | | | | | | | | | |
| Total Weight, Grams | 53.2 | 40 | 43 | 32 | 41 | 32 | 62.5 | 66.5 | 86.5 | 47.5 |
| Weight Gamma Isomer | 16.4 | 1.8 | 9.7 | 5.3 | 7.3 | 1.4 | 16.0 | 32.0 | 38.9 | 9.2 |
| Percent Gamma | 30.9 | 4.5 | 22.5 | 16.7 | 17.9 | 4.4 | 25.6 | 48.1 | 45.0 | 19.3 |
| Percent Alpha | 68.8 | 76.0 | 75.7 | 80.7 | 81.4 | 94.7 | 74.6 | 50.0 | 53.3 | 79.7 |
| Percent Beta | 0.1 | 18.8 | 0.2 | | | | | 0.2 | | |
| Coarse Fraction Recovered (Product): | | | | | | | | | | |
| Total Weight, Grams | 278 | 112 | 130 | 148 | 85 | 82.5 | 119 | 141 | 117 | 126 |
| Weight Gamma Isomer | 277 | 111 | 129 | 145 | 83 | 67 | 79 | 61 | 21 | 112 |
| Percent Gamma | 99.5 | 99.2 | 99.7 | 98.0 | 98.2 | 81.0 | 66 | 43.5 | 17.7 | 88.9 |
| Percent Alpha | 0.5 | 0.8 | 0.3 | 2.0 | 1.8 | 19.5 | 35.3 | 56.2 | 81.9 | 11.5 |

Runs I through V show the production of substantially pure gamma isomer of benzene hexachloride, with runs I, II and III showing the production of lindane in a single classification step. The products of runs IV and V may be purified by conventional means, such as treatment with activated charcoal, recrystallization, et cetera, to produce lindane. It may be observed that in the first five runs, the ratio of dissolved gamma to alpha was at least two to one. In none of the runs was beta isomer present in detectable amount in coarse fraction or product. It was usually also substantially absent from the fine fraction, even where it was added with the composition of solid benzene hexachloride isomers to be dissolved in the solvent. This is explained by the fact that there is a strong tendency for the beta isomer to remain in solution over and above its normal saturation point. However, run II shows that when the beta isomer does crystallize, as by having a large quantity present in solution and seeding with beta isomer, it is separated from the gamma by the fluid classification and appears in the fine fraction with the separated alpha isomer, without contamination of the gamma product. This absence of beta contamination of the gamma product is desirable because certain toxic properties of benzene hexachloride have been connected with the beta isomer. It will also be observed that no delta or epsilon isomer is crystallized, even though there is some present in solution. This is because under the above conditions of operation the solvent still possessed complete dissolving power for the amount of these isomers present at the temperature and conditions of crystallization. It might be mentioned that the absence of delta isomer contamination of the product is also desirable because of its known phytocidal effect on plants. In the first five runs the percent of the gamma isomer recovered in the coarse fraction, based on the amount of crystalline gamma fluid classified, is above 92 percent and as high as 98.4 percent.

Runs VI and VII show the production of compositions containing enhanced proportions of the gamma isomer over and above that contained in the mixture of solid isomers treated. The products of these runs, which contain 81 and 66 percent gamma isomer, may be reprocessed in accordance with this invention to yield lindane or they may be used in insecticidal formulations as such for certain purposes. In these two runs it will be noted that an appreciable enhancement of the gamma isomer in the product was realized when the ratio of gamma to alpha isomer in the dissolved solids was at least 1.4 to 1.0. In run VI, 98 percent of the gamma isomer fluid classified was recovered as a product containing 81 percent of gamma isomer.

Runs VIII and IX illustrate the reversal of the process, which results in no enhancement of the proportion of gamma isomer in the coarse fraction over that in the solid benzene hexachloride to be dissolved and no enhancement of the ratio of the gamma isomer to alpha isomer in said fraction over that in the dissolved solids, but rather a decrease in both respects. An examination of the composition of the fine and coarse fractions shows that fluid classification failed to separate the alpha and gamma isomers, large amounts of both appearing in the solids collected at the top and the bottom of the column. Thus, when the ratio of dissolved gamma to alpha isomers in the solution to be crystallized is less than about 1.4 to 1.0, particularly 1.24 to 1.0 and 1.09 to 1.0, the method is inoperative for the purpose of this invention.

Run X illustrates the effect of conducting the crystallization at 30 degrees centigrade instead of 10 degrees centigrade. Substantially the same mixture of solid benzene hexachloride isomers as used in runs III and IV was dissolved in methanol previously saturated with respect to the gamma and alpha isomers, crystallized in the usual manner with cooling only to 30 degrees centigrade, and subjected to fluid classification. An examination of the results shows a substantial enhancement of the percentage of the gamma isomer, and of the ratio of gamma to alpha isomer, in the coarse fraction.

We do not wish therefore to be limited to a temperature of 10 degrees centigrade for the crystallization, which we prefer to conduct between zero degrees centigrade and 30 degrees centigrade, but which may be effected at any convenient temperature between about −50 degrees and 50 degrees centigrade.

In general, the data show that as the ratio of dissolved gamma to alpha isomer in the solution to be crystallized increases above 1.4 to 1.0, a more and more favorable gamma enhancement in the coarse fraction can be realized by fluid classification. When the ratio of dissolved gamma to alpha isomer in the solution to be crystallized is substantially less than about 1.4 to 1.0, as for example, 1.24 to 1.0 or 1.09 to 1.0, enhancement of gamma in the coarse fraction is not realized, and the fluid classification becomes inoperative and of no practical importance insofar as the objects of this invention are concerned.

We claim:
1. The process which comprises: making a solution containing benzene hexachloride isomers wherein the ratio of dissolved gamma to alpha isomer is at least 1.4 to 1.0, effecting crystallization of at least gamma and alpha isomers from the solution, separating the crystals so produced from each other by fluid classifying in said solution, and recovering a fraction in which the ratio of gamma to alpha isomer is enhanced over that in the solution before crystallization.

2. The process of claim 1 wherein the crystallization is effected by cooling.

3. The process of claim 1 wherein the ratio of dissolved gamma to alpha isomer is at least 2.0 to 1.0 and wherein a product consisting of substantially pure gamma isomer is recovered.

4. The process of claim 1 wherein the solution containing benzene hexachloride isomers is made by dissolving a benzene hexachloride composition in a solvent already containing isomers of benzene hexachloride dissolved therein.

5. The process of claim 1, wherein the solution employed is methanolic.

6. A process which comprises: making a methanolic solution containing benzene hexachloride isomers wherein the ratio of dissolved gamma to alpha isomer is at least 2.0 to 1.0, effecting crystallization of at least gamma and alpha isomers from the solution by cooling, separating the crystals so produced from each other by fluid classifying in a methanolic solution saturated with at least the gamma isomer and recovering a fraction in which the ratio of gamma to alpha isomer is enhanced over that in the solution before crystallization.

References Cited in the file of this patent

UNITED STATES PATENTS

| Number | Name | Date |
|---|---|---|
| 2,214,206 | Rasor | Sept. 10, 1940 |
| 2,356,547 | Tiedemann | Aug. 22, 1944 |
| 2,363,066 | Ladd | Nov. 21, 1944 |
| 2,434,649 | Gruskin | Jan. 20, 1948 |
| 2,469,418 | Striplin | May 10, 1949 |
| 2,573,676 | Campbell | Nov. 6, 1951 |

FOREIGN PATENTS

| Number | Country | Date |
|---|---|---|
| 334,169 | Great Britain | Aug. 14, 1939 |
| 573,689 | Great Britain | Dec. 3, 1945 |

OTHER REFERENCES

Chemistry and Industry, October 13, 1945, pages 314–319, "The Gamma Isomer etc.," by Slade.

Manufacturing Chemist, September 1948, page 386, "Benzene Hexachloride Plus."